Sept. 29, 1970 P. A. E. GARDNER ET AL 3,531,778

DATA STORAGE DEVICES USING CROSS-COUPLED PLURAL EMITTER TRANSISTORS

Filed Jan. 3, 1968 3 Sheets-Sheet 1

INVENTORS
PETER A.E. GARDNER
MICHAEL H. HALLETT

BY James E. Murray

ATTORNEY

United States Patent Office 3,531,778

Patented Sept. 29, 1970

3,531,778

DATA STORAGE DEVICES USING CROSS-COUPLED PLURAL EMITTER TRANSISTORS

Peter A. E. Gardner, Winchester, and Michael H. Hallett, Chandlers Ford, England, assignors to International Business Machines Corporation, Armonk, N.Y., a corporation of New York Filed Jan. 3, 1968, Ser. No. 695,377
Int. Cl. G11c *11/40;* H03k *3/286, 4/82*
U.S. Cl. 340—173 7 Claims

ABSTRACT OF THE DISCLOSURE

This specification describes a transistor storage cell which can be used to perform storage, associative storage and/or logical functions. The cell contains two double emitter semiconductor elements with their base and collector electrodes cross-coupled to form a bistable circuit. Each element has one emitter electrode connected to a bit line and another emitter electrode connected to a word line. There is a separate level control for each of the bit and word lines connected to the cell and for the line supplying excitation for powering the storage cell. These level controls are for changing the information stored in the cell and for determining what information is stored in the cell.

SUMMARY OF THE INVENTION

The invention relates to data storage devices and data stores employing such devices.

U.S. application Ser. No. 465,593, which has now matured into U.S. Pat. No. 3,423,737, filed June 21, 1965, discloses a storage cell having two double emitter semiconductor elements with their base and collector electrodes cross-coupled to form a bistable circuit while their emitter electrodes are connected to word and bit lines which permit the "writing" of information into the cell and the "reading" out of information in the cell by the manipulation of the relative levels of potential on the emitter electrodes. In accordance with the present invention, this storage cell is modified to make it more versatile, particularly in performing associative memory and/or logical functions. To this end, a storage cell of the type described has been provided with biasing means for manipulating the potential on each of the emitters separately of the potential on the other emitters and with a variable source of excitation for powering the cell. The biasing means and source of excitation are used to "write" information into the storage cell, "read" information stored in the cell and to perform a number of logical functions which are described hereinafter in detail.

Therefore it is an object of the present invention to provide storage cells that can be fabricated into monolithic memory arrays.

It is another object of the present invention to provide memories which are capable of performing associative memory and/or logical functions.

It is a further object of the present invention to provide a memory capable of performing associative memory and/or logical functions that employ cells with cross-coupled double emitter semiconductors.

DESCRIPTION OF THE DRAWINGS

The foregoing and other objects, features and advantages of the invention will be apparent from the following more particular description of preferred embodiments of the invention of which.

DESCRIPTION OF THE PREFERRED EMBODIMENTS

Figure 1:
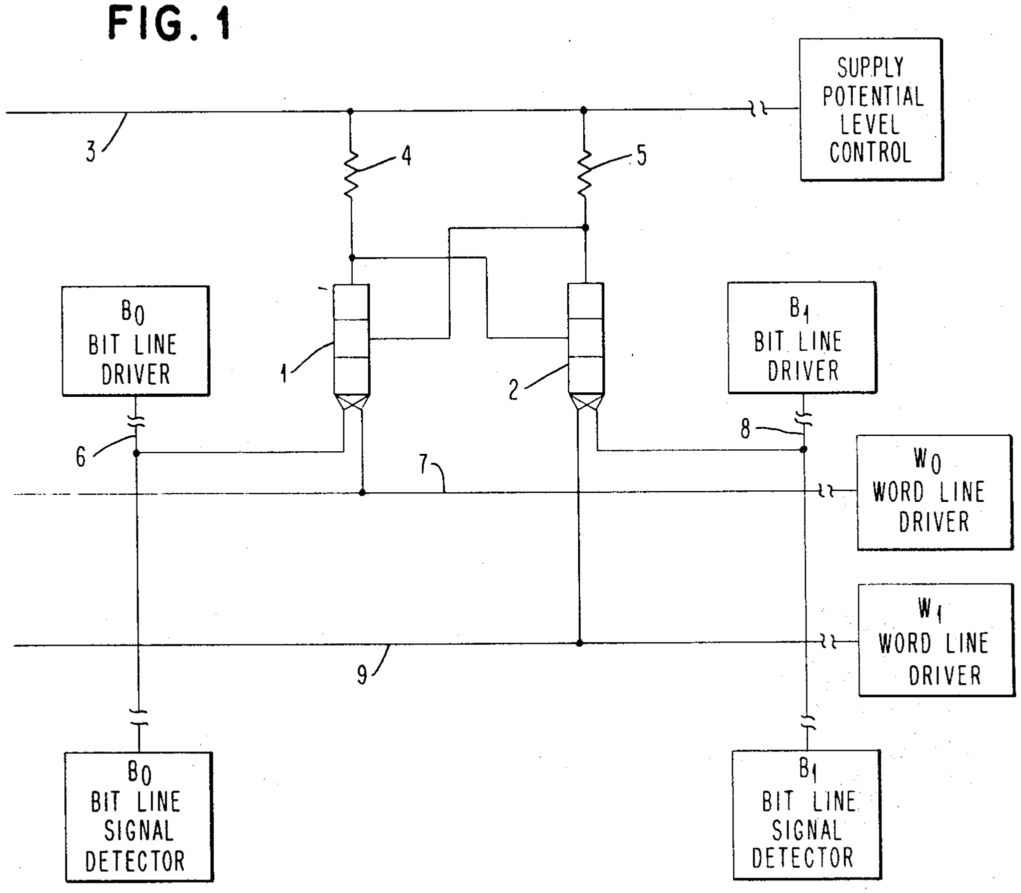
FIG. 1 shows a storage element according to the invention.

Referring to FIG. 1, the data storage device is shown as two double emitter transistors 1 and 2 with base and collector electrodes cross-coupled. Each double emitter transistor may be replaced for example, by two separate transistors having their base electrodes connected together and their collector electrodes connected together. Alternatively, the base and collector electrodes may be connected through various resistor networks, as will be apparent to persons skilled in the art, for example to keep one or other transistor of the pair from saturating. The name "double emitter semiconductor element," used in the specification and claims, is intended to include all these constructons and, irrespective of which construction is used, the element will be regarded as having a single base electrode, a single collector electrode and two emitter electrodes. The double emitter transistor is possibly more convenient when the storage device is to be constructed using integrated circuit techniques and it is this construction chosen as the preferred arrangement described in this specification.

The collector electrodes of the two transistors 1 and 2 are connected to a common supply conductor 3 through equal resistors 4 and 5. One emitter electrode of transistor 1 is connected to an output conductor 6 and the other to a control conductor 7. Similarly, transistor 2 has one emitter electrode connected to an output conductor 8 and the other to a control conductor 9.

The potentials of the supply conductor 3, output conductors 6 and 8 and control conductors 7 and 9 are chosen so that the device operates as a bistable circuit and can be used for storing data in binary form. Thus, when one transistor is conducting the device is regarded as storing one binary value and when the other transistor is conducting it is regarded as storing the other binary value.

The potential of the control conductors 7 and 9 are normally maintained at a lower value than the potentials of the output conductors 6 and 8 so that the current through a conducting transistor normally passes to the associated control conductor and not to the output conductor. When it is required to interrogate the device to establish which transistor is conducting, and thus which binary value is stored, the potential of one of the control conductors 7 or 9 is raised to above the potential of the associated output conductors 6 or 8. If the transistor connected to the control conductor is in its conducting state, then the current normally passing to the control conductor will be diverted to the output conductor where it is sensed. A sensing device is connected to each output conductor. If the transistor connected to the control conductor is not conducting then no pulse is received on the output conductor and it is evident that the other transistor is conducting. It follows therefore, that interrogation of either control conductor will indicate the state of the device and hence the binary value stored. Although not essential a pulse applied to the supply conductor at the same time as the pulse is applied to the control conductor produces a larger signal on the output conductor if the associated transistor is conducting.

Figure 2:
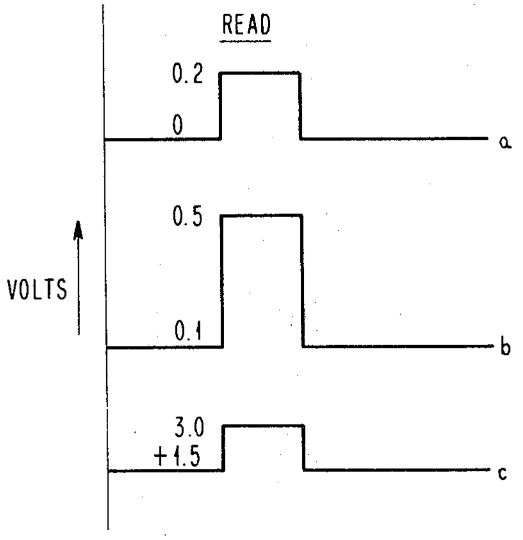
FIG. 2 shows the voltage waveforms supplied to the element of FIG. 1 to effect a read operation.

The various waveforms to accomplish the read operation are shown in FIG. 2, the potentials having been chosen to suit the particular transistors forming the device. FIG. 2*a* shows the voltage waveform applied to one of the control conductors 7 or 9 the potential of which is seen to be raised from its normal ground potential to 0.2 volt. If the transistor connected to the energized control conductor is in its conducting state then a change in voltage similar to that shown in FIG. 2*b* will appear on the output conductors 6 or 8 and be detected by the sensing device. Naturally, if the transistor connected to the energized control conductor is not conducting then no signal will be produced on either output conductor. Consequently, the state of the storage device can be ascertained by energizing either control conductor and noting whether or not a pulse is produced on the associated output conductor. A larger output signal is obtained if during the time the control conductor is energized a positive pulse is applied to the supply conductor 3. This is represented by the waveform C in FIG. 2. It will be noted that the normal potential of the output conductor is higher than the normal potential of the control conductor so that the current through a conducting transistor connected to these conductors normally flows to the control conductor.

Figure 3:
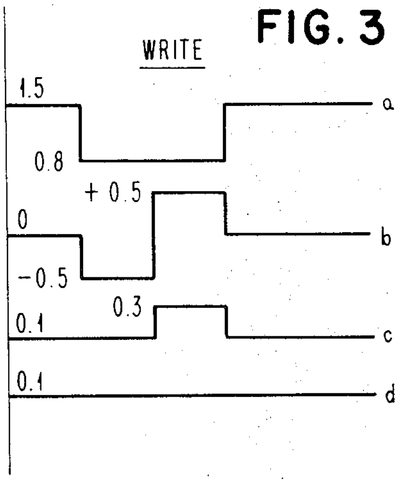
FIG. 3 shows the voltage waveforms supplied to the element to effect a write operation.

Two methods by which data may be stored in the device will now be described. Referring to FIG. 3 the various voltage levels applied to the device necessary to accomplish a "write" operation are shown. First the potential of the supply conductor 3 is lowered from its normal value of 1.5 volts to 0.8 volt as shown in FIG. 3*a*. The transistor conducting at this time continues to conduct but the device is now much more sensitive to voltage changes on the other electrodes. Data can be written by appropriate energization of the control and output conductors connected to either transistor 1 or 2. It does not matter which conductors are used and since the operation is the same in either case the "write" operation will be described using the conductors 6 and 7 connected to transistor 1.

With the device in its "sensitive" state, the potential of the control conductor 7 is lowered from its normal ground potential to −0.5 volt to ensure that transistor 1 is made to conduct. Immediately afterwards the control conductor is taken positive, shown as 0.5 volt, which causes the current from transistor 1 to be diverted to the output conductor 6 as already explained. This is illustrated in FIG. 2*b*. If transistor 1 in its conducting state represents the required binary value to be stored then no further step is necessary and when the control potential on conductor 7 is returned to ground and the supply potential on conductor 3 raised once again to its normal operating value, transistor 1 remains in its conducting state and the current once more flows to the control conductor 7. If on the other hand, the required binary value is not represented by transistor 1 in its conducting state but rather by transistor 2 in its conducting state then a positive pulse is applied to the output conductor 6 at the same time as the positive pulse is applied to control conductor 7. This will cause the device to switch from one to the other state and transistor 2 will be forced to conduct. The voltage waveform applied to the output conductor for this to be achieved is shown in FIG. 3*c*. This state of conduction is maintained when the control conductor 7, output conductor 6 and supply conductor 3 are returned to their normal operating potentials and the device stores the required binary value. For the sake of completeness, FIG. 3*d* shows the output conductor 6 maintained at constant voltage when the binary value to be stored is already represented by transistor 1 conducting. Since the potentials of the two emitters of transistor 1 do not both rise above the potentials of the emitters of transistor 2 the state of the device is unchanged.

Figure 4:
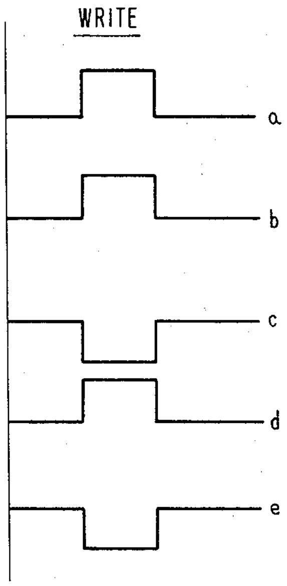
FIG. 4 illustrates an alternative method of writing.

An alternative method of writing data is now described with reference to FIG. 4. Initially the potential of both control conductors 7 and 9 is raised (FIGS. 4*a* and 4*b*) to divert the current from the conducting transistor to the associated output conductors 6 or 8. The potential of the output conductors 6 or 8 connected to the transistor ultimately to be made conductive is either left unchanged or lowered (FIG. 4*c*) and the voltage of the other output conductor raised (FIG. 4*d*) to block current flow therethrough. This results in the transistor with the most negative emitter being forced to conduct.

The operation is aided by lowering the supply voltage (FIG. 4*d*) as described before with reference to FIG. 2. If the supply potential is lowered so that the transistors cease to conduct then the voltage difference between the positive and negative signals applied to the output conductors necessary to effect switching is much less. Of course, the transistor having the lower emitter will conduct to the exclusion of the other when the supply is returned to its quiescent, or normal operating, value. Restoration of the normal potentials leaves the device set in the state dictated by the "write" operation, storing the required data.

Figure 5:
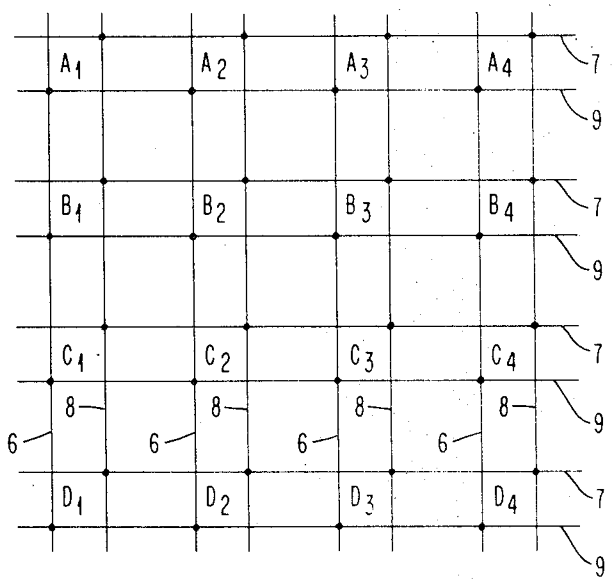
FIG. 5 shows schematically a store utilizing the elements shown in FIG. 1.

FIG. 5 shows a diagrammatic representation of a data store utilizing the storage device described above. For the sake of simplicity only a small portion of the store is shown and only the control conductors 7 and 9 and output conductors 6 and 8 are included. The transistors forming the device are represented by dots and the cross-couplings and supply connected are omitted altogether. This arrangement of storage device in rows and columns means that data can be read into more than one location at one time. Thus, by supplying the output conductors 6 and 8 with appropriate voltage pulses depending on the binary value to be stored and controlling the voltage of the control and supply conductors as explained above, a number of binary digits or "bits" can be written simultaneously in a row of the store to represent a "word" of data. Since a word is stored in the direction of control conductors 7 and 9 these are also referred to as the word conductors of the store. Similarly, since the bit to be stored at a particular storage location $A_1, A_2 \ldots D_4$ is controlled by the voltages applied to the output or sense conductors 6 and 8 these are also known as the bit/sense conductors of the store.

On inspection it is seen that the store is symmetrical in that sensing devices may be connected to the control conductors 7 and 9 and data read from the store by interrogating the bit/sense conductors. This so-called "bilateral interrogation" is particularly useful when the store is used for "content addressing." For example if an address word for which the contents of the store is to be searched is applied to the bit/sense conductors in complement form and the ZERO's in the complement word are applied as positive signals to the ZERO bit/sense lines and the ONE's in the complement word are applied as positive signals to the ONE bit/sense lines then the absence of a signal on a control conductor indicates matching of the address word with the stored word associated with that control conductor.

In the embodiment being described it has been chosen that a binary ONE is stored when transistor 2 of a storage device is conducting and a binary ZERO when transistor 1 is conducting. The word conductor 9 and bit/sense conductor 8, being connected to transistor 2 of a device, are conveniently referred to as the "ONE" word conductor and the "ONE" bit/sense conductor respectively. Likewise the word conductor 7 and bit/sense conductor 6 are referred to as the "ZERO" word conductor and the "ZERO" bit/sense conductor respectively.

The data store thus far described is useful not only for the storage of data but also for performing various logical operations. A logical transfer of data from one storage device to any other storage device connected to the same bit/sense conductors can be effected by energization of the appropriate conductors. For example, assume storage device $A_1$ is read out as described previously. At the same time, the supply voltage applied to the collectors of the transistors in device $B_1$ is lowered to sensitize the device $B_1$ and the control voltage on the word lines for device $B_1$ is raised. Then when a pulse appears on the bit/sense conductor of device $A_1$, device $B_1$ will be set to store the opposite binary value. For this operation to be successful it is necessary to interrogate device $A_1$ by using the word conductor connected to the conducting transistor. Suppose that $A_1$ is storing a binary ONE. Then an interrogation on word conductor 9 will produce a pulse on bit/sense conductor 8 which can be used to write a binary ZERO into $B_1$, $C_1$ or $D_1$ depending on which one is sensitized. If $A_1$ was interrogated on word conductor 7 then no pulse would appear on bit/sense conductor 6 and the sensitized device would remain unchanged.

The following examples will show how more complicated logical operations can be performed within the data store by using this "transfer" technique.

EXAMPLE 1

Device $A_1$ and device $B_1$ are read out simultaneously onto the ONE bit/sense conductor and device $C_1$ is sensitized by lowering the collector voltage and raising the voltage on the control lines. The result is that device $C_1$ will only store a binary ONE after this operation if initially it was storing a binary ONE and both device $A_1$ and device $B_1$ were storing a binary ZERO. Any other set of conditions results in device $C_1$ being in the binary ZERO state after interrogation. This logical operation can be represented by the Boolean expression:

$$C_F = C_1, \overline{A}_1, \overline{B}_1$$

where $C_F$ is the final state of the device $C_1$.

EXAMPLE 2

Device $A_1$ and device $B_1$ are read out simultaneously onto the ZERO bit/sense conductor and device $C_1$ is sensitized as in the previous example. The result is that device $C_1$ will remain or be switched to the binary ONE state only if it is originally in the ONE state or if either $A_1$ or $B_1$ is storing a binary ZERO. Any other set of conditions will cause $C_1$ to be set in the binary ZERO state. This logical operation may be represented by the Boolean expression:

$$C_F = C_1 + \overline{A}_1 + \overline{B}_1$$

EXAMPLE 3

Device $A_1$ and device $B_1$ are read out simultaneously onto both ZERO and ONE bit/sense conductors, device $C_1$ having been sensitized. The result is that the state of $C_1$ is unchanged if $A_1$ and $B_1$ are storing opposite values. $C_1$ will be forced to a ZERO if both $A_1$ and $B_1$ are storing ONE's and will be formed to a ONE if both $A_1$ and $B_1$ are storing ZERO's. Thus the condition necessary to ensure device $C_1$ stores a ONE can be written as the expression:

$$C_F = A_1, \overline{B}_1, C_1 + \overline{A}_1, B_1, C_1 + \overline{A}_1, \overline{B}_1$$

There are many variations to the above examples as will be evident to persons skilled in the art. Thus in Example 3 the contents of the device $A_1$ can be read out onto the ONE bit/sense conductor while the contents of $B_1$ is being read out onto the ZERO bit/sense conductor. It is possible to reset $C_1$ to a desired state before writing into it from A and B. Also by transferring the contents of C into address D say, the logical complement of C is obtained.

Figure 6:
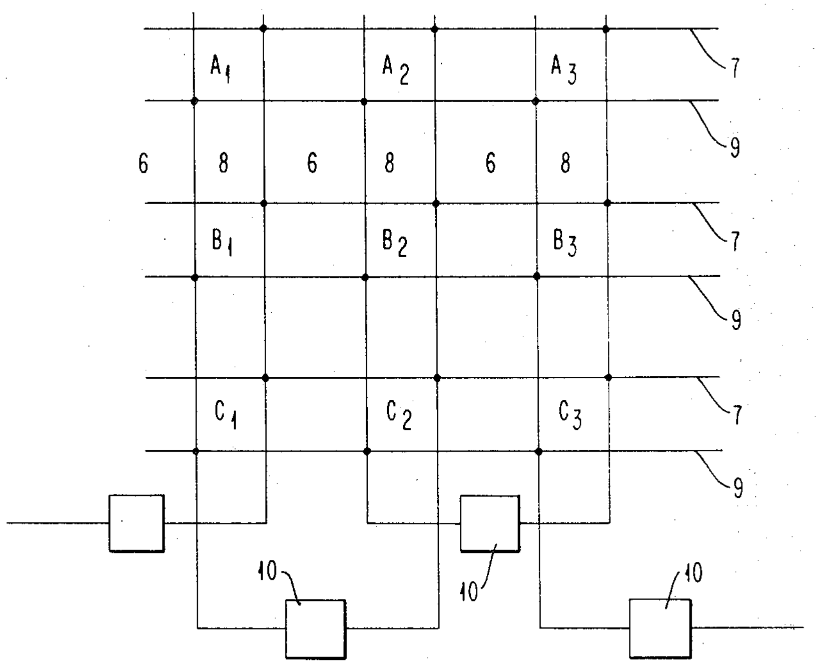
FIG. 6 shows how shifting operations can be performed in the store shown in FIG. 5.

FIG. 6 shows how, with external gating, shifting operations are carried out in the store. The bit to be shifted, $A_2$ for example, is read out as described previously on the ONE bit/sense line 8 by appropriate energization of the A word conductor 9. At the same instant the device to which the bit to be shifted, $C_1$ for example, is reset to ZERO using ZERO word conductor 9. Then, if $A_2$ was storing binary ZERO no pulse will appear on the bit/sense conductor 8 of device $A_2$ and consequently the bit/sense conductor 6 of device $C_1$ will not be energized. Thus the device $C_1$ remains in its reset ZERO condition and the shifting of the bit stored in $A_2$ to $C_1$ has been accomplished. If $A_2$ was storing a ONE then the pulse produced on bit/sense conductor 8 will be gated via external gating circuit 10 to the bit/sense conductor 6 of device $C_1$ causing the state of this device to switch from the reset ZERO condition to the ONE condition thereby accomplishing the shift operation. Since the ZERO bit/sense conductor 6 of one cell is connected to the ONE bit/sense conductor 8 of the neighbouring cell information may be shifted through the store quite readily. The only criteria being that whichever word and bit/sense conductors are used for read out, that is ZERO or ONE the other significant word and bit/sense conductors must be used to write the data back into the store.

Figure 7:
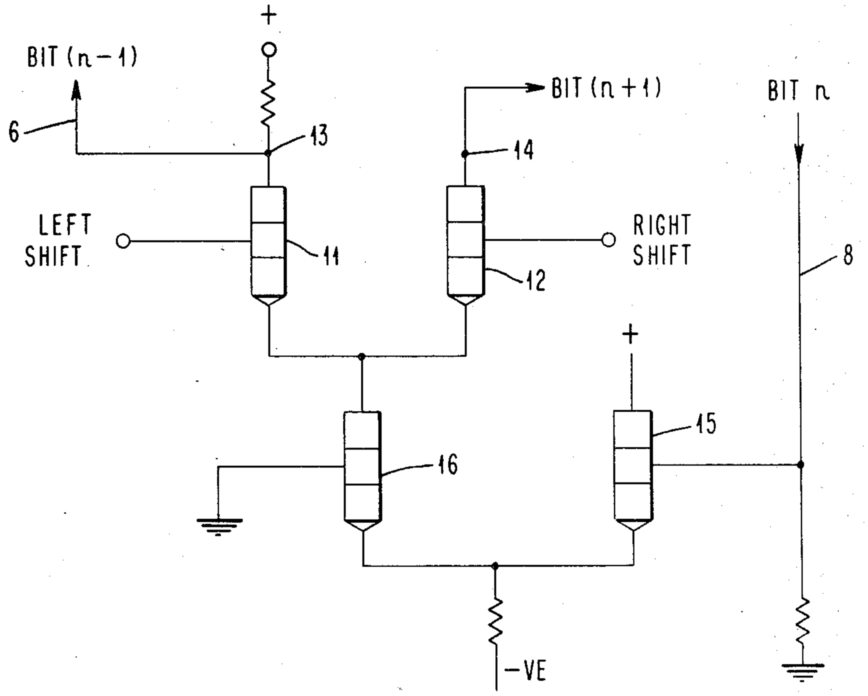
FIG. 7 shows a gate circuit utilized in the store of FIG. 6.

The gating or shift circuit 10 is shown in detail in FIG. 7 and can be controlled to shift information in either direction through the store. Thus for a left shift a positive signal is applied to the base electrode of transistor 11 and for a right shift to the base of transistor 12. The transistor selected is made conductive and the potential of point 13 or point 14 falls. When a pulse appears on the bit/sense conductor 8 from the bit being read out (shown as bit *n* in FIG. 7) transistor 15 which is normally OFF is caused to conduct. This results in transistor 16 being cut off and also transistor 11 or 12 previously selected by the left or right shift pulse. Consequently the potential of point 13 or 14 rises and a positive pulse is transmitted to the ZERO bit/sense conductor 6 of the storage device selected to receive the information. When the output pulse from bit *n* ceases then transistor 16 once more conducts and the positive pulse supplied to the ZERO bit conductor is terminated.

Figure 8:
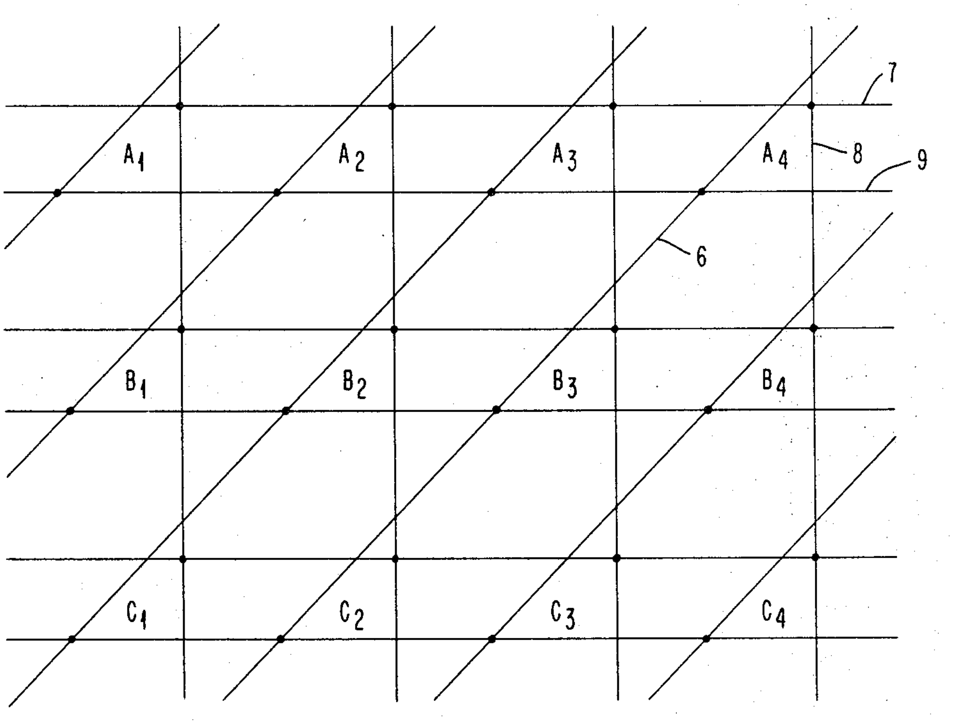
FIG. 8 shows a modified store suitable for shifting operations.

Finally, the store can be modified in such a way that shifting is possible without the need for the external shift circuits such as has just been described. The modification is shown in FIG. 8. Here it is seen that the word conductors 7 and 9 and the ONE bit/sense conductors 8 are connected to the devices $A_1$ . . . $C_4$ as before but the ZERO bit/sense conductors 6 are connected diagonally through the store. Thus, vertical shifting can be accomplished by reading out on the ONE bit/sense conductor 8 and diagonal shifting by reading out on the ZERO bit/sense conductor 6. The procedure is complicated somewhat by the fact that a true shift takes place when a vertical shift is performed whereas a complement shift takes place when a diagonal shift is performed.

While the invention has been particularly shown and described with reference to the preferred embodiments thereof, it will be understood by those skilled in the art that various changes in form and details may be made therein without departing from the spirit and scope of the invention.

What is claimed is:

1. In a data storage device of the type having two multiple emitter transistors with base and collector electrodes cross-coupled to form a bistable circuit and having one emitter of each such transistor connected to an output conductor and the other emitter of each such transistor connected to a control conductor, the improvement which comprises (a) a separate output conductor and a separate control conductor for each transistor, (b) means for controlling the potential on each of the conductors independently of the other whereby the conduction through the emitters of the transistors is selected by the relative levels of potential on their emitters, and (c) bilevel source means for providing two levels of potential to the collectors of the transistor, one level while they are storing data and a lower level while they are being accessed for writing which sensitizes both transistors so that upon subsequent increase in the excitation to the collectors the state of the bistable circuit will be determined by the relative magnitudes in the potentials on the emitters of the two semiconductor elements at the time of such increase.

2. A data storage system comprising (a) a number of bit and word lines defining a matrix of bit positions arranged in a plurality of rows and columns;

(b) a bistable circuit means at each of the bit positions having first and second multi-emitter semiconductors with base and collector electrodes cross-coupled so that while one semiconductor is conducting, the other is held nonconducting, each said first semiconductor being connected through different emitters to a first word line and a first bit line and each said second semiconductor being connected through different emitters to a second word line and a second bit line;

(c) means for independently varying the potentials on each of the first and second bit and word lines so that conduction can be switched from one emitter to the other in the conducting semiconductor by changing the relative levels of potential on the bit and word lines connected to that semiconductor; and (d) variable supply means for supplying excitation at two levels of potential to the collector elements of the semiconductor elements in one word line of storage cells independently of the semiconductor elements in the other word line of storage cells, one level while the storage cell is storing data and a second lower level while they are being accessed for rendering both the first and second transistors of the cells sensitized so that upon the subsequent increase in the excitation for powering the bistable circuits the conducting semiconductor will be determined by the relative levels of potential supplied to the semiconductors by the bit and word lines.

3. The data storage system of claim 2 wherein the means for independently varying the potentials on each of the first and second bit and word lines are each individual means for operating independently of one another.

4. A data storage system as claimed in claim 3, including word line means connecting corresponding elements in the same row of the matrix with a common word line and bit line means connecting corresponding elements in the same column of the matrix with a common bit line.

5. A data storage system as claimed in claim 4 including individual level control circuit means coupled to each word line and arranged to supply energization of suitable amplitude and polarity to ascertain the bistable state of any element connected thereto.

6. A data storage system as claimed in claim 5 including shift circuit means coupling one bit line of a column of bistable circuits to a bit line of a preceding column of bistable circuits and further shift circuit means coupling the other bit line of the column of bistable circuits to a bit line of a succeeding column of bistable circuits.

7. A data storage system as claimed in claim 5 including means to simultaneously vary the word line potential of a first bistable circuit with the word line potential and the excitation potential of a second bistable circuit having common bit lines with the first bistable circuit so that a pulse produced on the common bit lines by the first bistable circuit determines the state of the second bistable circuit.

References Cited

UNITED STATES PATENTS

| | | | |
|---|---|---|---|
| 3,218,613 | 11/1965 | Gribble | 340—173 |
| 3,423,737 | 1/1969 | Harper | 340—173 |
| 3,436,738 | 4/1969 | Martin | 340—173 |

FOREIGN PATENTS

| | | |
|---|---|---|
| 958,242 | 5/1964 | Great Britain. |

TERRELL W. FEARS, Primary Examiner

U.S. Cl. X.R.

307—238, 291